United States Patent
Chang et al.

(10) Patent No.: US 9,383,531 B2
(45) Date of Patent: Jul. 5, 2016

(54) LIGHT SIGNAL GATHERING DEVICE AND OPTICAL MODULE USED THEREOF

(71) Applicant: HON HAI PRECISION INDUSTRY CO., LTD., New Taipei (TW)

(72) Inventors: Chun-Yi Chang, New Taipei (TW); Jia-Hau Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/260,209

(22) Filed: Apr. 23, 2014

(65) Prior Publication Data

US 2014/0314380 A1    Oct. 23, 2014

(30) Foreign Application Priority Data

Apr. 23, 2013  (TW) .................................. 102114284
Apr. 23, 2013  (TW) .................................. 102114285

(51) Int. Cl.
*G02B 6/36*  (2006.01)
*G02B 6/42*  (2006.01)
*G02B 6/32*  (2006.01)

(52) U.S. Cl.
CPC .............. *G02B 6/425* (2013.01); *G02B 6/4201* (2013.01); *G02B 6/32* (2013.01); *G02B 6/4214* (2013.01); *G02B 6/4249* (2013.01); *G02B 6/4274* (2013.01); *G02B 6/4292* (2013.01); *G02B 6/4293* (2013.01)

(58) Field of Classification Search
CPC .. G02B 6/4249; G02B 6/4292; G02B 6/4293; G02B 6/4214; G02B 6/4201; G02B 6/32; G02B 6/425; G02B 6/4274
USPC .......................................... 385/73–74, 88–94
See application file for complete search history.

(56) References Cited

U.S. PATENT DOCUMENTS

| 7,113,671 | B2 * | 9/2006 | Sergey ................. G02B 6/4206 385/33 |
| 7,583,867 | B2 * | 9/2009 | Terada et al. ................... 385/14 |
| 2003/0053770 | A1 * | 3/2003 | Noddings ........ B29D 11/00663 385/95 |
| 2004/0131311 | A1 * | 7/2004 | Sergey ................. G02B 6/4206 385/33 |
| 2006/0008214 | A1 * | 1/2006 | Giboney et al. .................. 385/92 |
| 2008/0044127 | A1 * | 2/2008 | Leising .............. G02B 6/12004 385/14 |
| 2008/0232737 | A1 * | 9/2008 | Ishigami et al. ................. 385/14 |
| 2009/0028575 | A1 * | 1/2009 | Epitaux et al. ................ 398/139 |
| 2010/0302544 | A1 * | 12/2010 | Duer .................... G02B 6/4226 356/432 |
| 2011/0013866 | A1 * | 1/2011 | Rosenberg ........... G02B 6/0096 385/14 |

(Continued)

FOREIGN PATENT DOCUMENTS

| CN | 2376094 | 4/2000 |
| CN | 101794005 A | 8/2010 |

(Continued)

*Primary Examiner* — Ryan Lepisto
*Assistant Examiner* — Guy Anderson
(74) *Attorney, Agent, or Firm* — Wei Te Chung; Ming Chieh Chang (57) ABSTRACT

An optical module (100) set on a substrate for assembling with a fiber (72) and comprises a light signal gathering device (8), a plurality of electrical contacts (2) set on the light signal gathering device (8) and an optoelectronic device (4) soldered to the electrical contacts (2) for receiving the light signals refocused by the light signal gathering device (8) and transferring the light signals to electrical signals, the light signal gathering device (8) includes a resin body (1) and a light signal gathering portion set on the resin body (1) for refocusing light signals.

5 Claims, 9 Drawing Sheets (56) References Cited

U.S. PATENT DOCUMENTS

| | | | |
|---|---|---|---|
| 2012/0027345 A1* | 2/2012 | Castagna et al. | 385/33 |
| 2012/0163754 A1* | 6/2012 | Benjamin et al. | 385/33 |
| 2012/0326014 A1 | 12/2012 | Wu | |
| 2013/0011100 A1* | 1/2013 | Shiraishi | G02B 6/3861 385/77 |
| 2014/0169727 A1 | 6/2014 | Siemon | |

FOREIGN PATENT DOCUMENTS

| | | |
|---|---|---|
| CN | 102129102 A | 7/2011 |
| CN | 102213802 A | 10/2011 |
| CN | 102667565 A | 9/2012 |
| TW | 201130117 A1 | 9/2011 |
| TW | M445187 | 1/2013 |

* cited by examiner

LIGHT SIGNAL GATHERING DEVICE AND OPTICAL MODULE USED THEREOF

BACKGROUND OF THE INVENTION

1. Field of the invention

The present invention relates to a light signal gathering device, and more particularly to a light signal device for gathering light signals and transferring the light signals to a optoelectronic device to transfer the light signals to electrical signals.

2. Description of related art

Chinese patent No. 102667565A issued to Enplas on Sep. 12, 2012 discloses a conventional optical module for transferring light signals to electrical signals. The light signals emitted by the fibers are transferred in a horizontal direction. But, the optical module can only receive the light signal transferred in a vertical direction. So, the transferring direction of the light signals is changed by a resin body and use lenses to gather the light signals. Thus, the light signals can be received by the optical module to be transferred to electrical signals. The lens adds the cost. At the same time, the position of the lens must in align with the optical module make it hard to be assembled.

Hence, it is desirable to provide an improved optical module to overcome the aforementioned disadvantages.

SUMMARY OF THE INVENTION

Accordingly, an object of the present invention is to provide a light signal gathering device assembled with the optoelectronic device to make the light signals can be received by the optoelectronic device precisely.

According to one aspect of the present invention, an optical module set on a substrate for assembling with a fiber and comprises a light signal gathering device, a plurality of electrical contacts set on the light signal gathering device and an optoelectronic device soldered to the electrical contacts for receiving the light signals refocused by the light signal gathering device and transferring the light signals to electrical signals, the light signal gathering device includes a resin body and a light signal gathering portion set on the resin body for refocusing light signals.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail.

FIGS. 1 to 5 illustrate an optical module 100 in accordance to a first embodiment of the present invention. The optical module 100 is set on a substrate 6 for transfers the light signals sent by fiber assembly 7 to electrical signals. The optical module 100 includes a light signal gathering device 8, a plurality of electrical contacts 2 and a retention contact 3 set on the light signal gathering device 8 and an optoelectronic device 4, soldered to the electrical contacts 2 and the retention contacts 3 by soldering materials 5.

Figure 1:
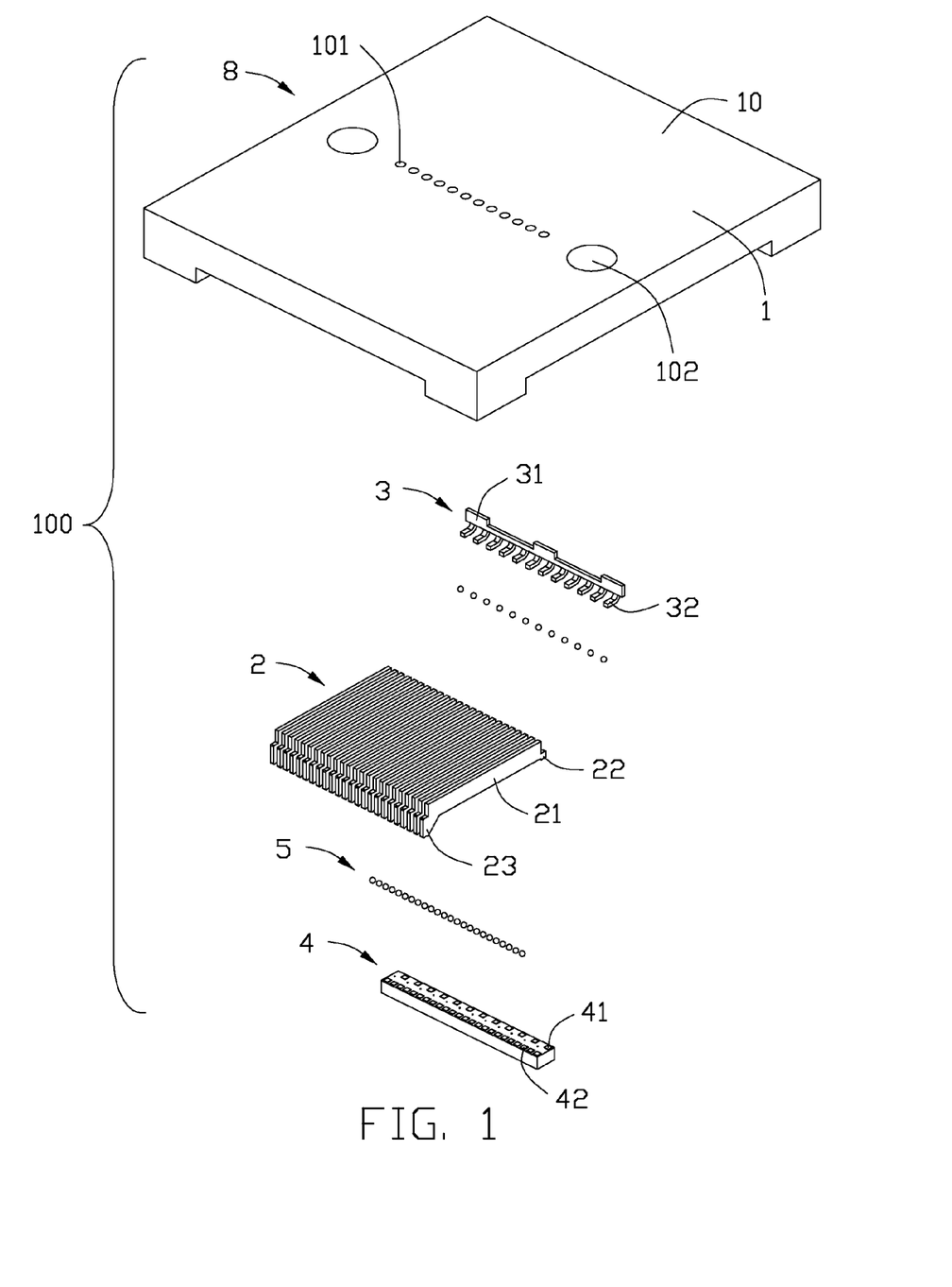
FIG. 1 is an exploded view of the optical module according to a first embodiment of the present invention.
Figure 2:
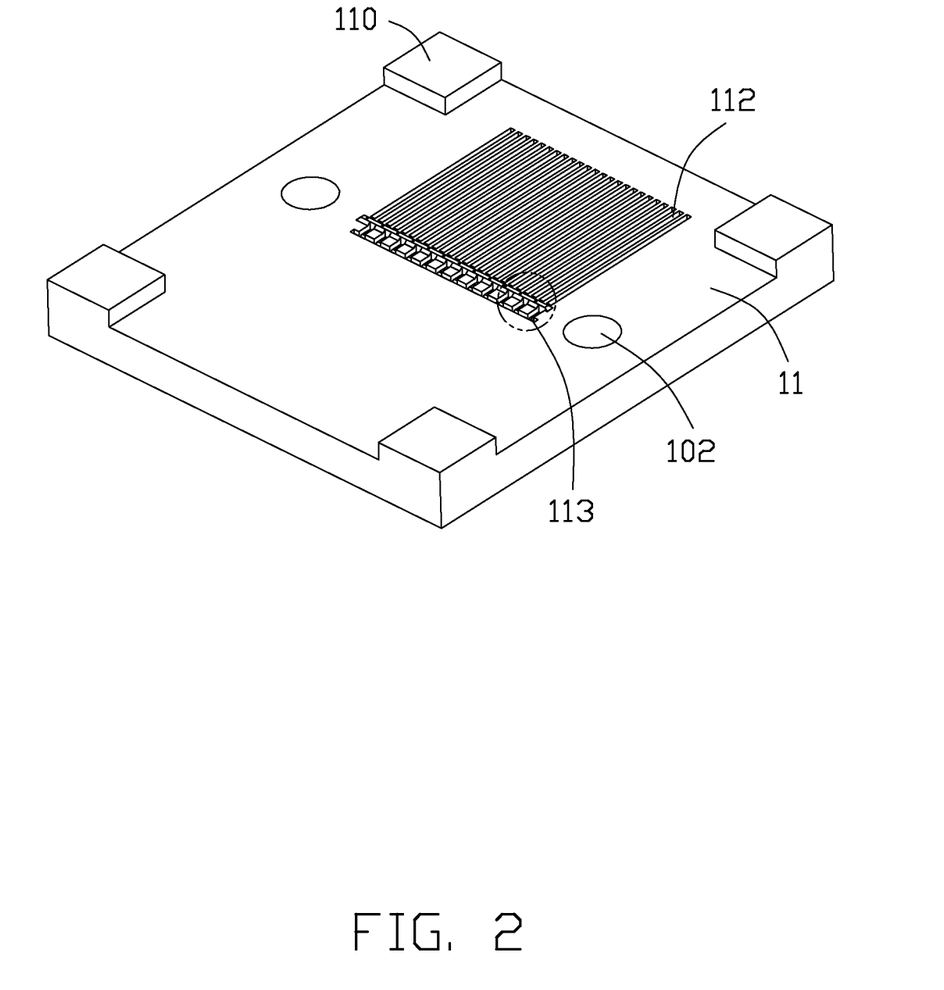
FIG. 2 is an isometric view of the light signal gathering device according to the present invention.
Figure 3:
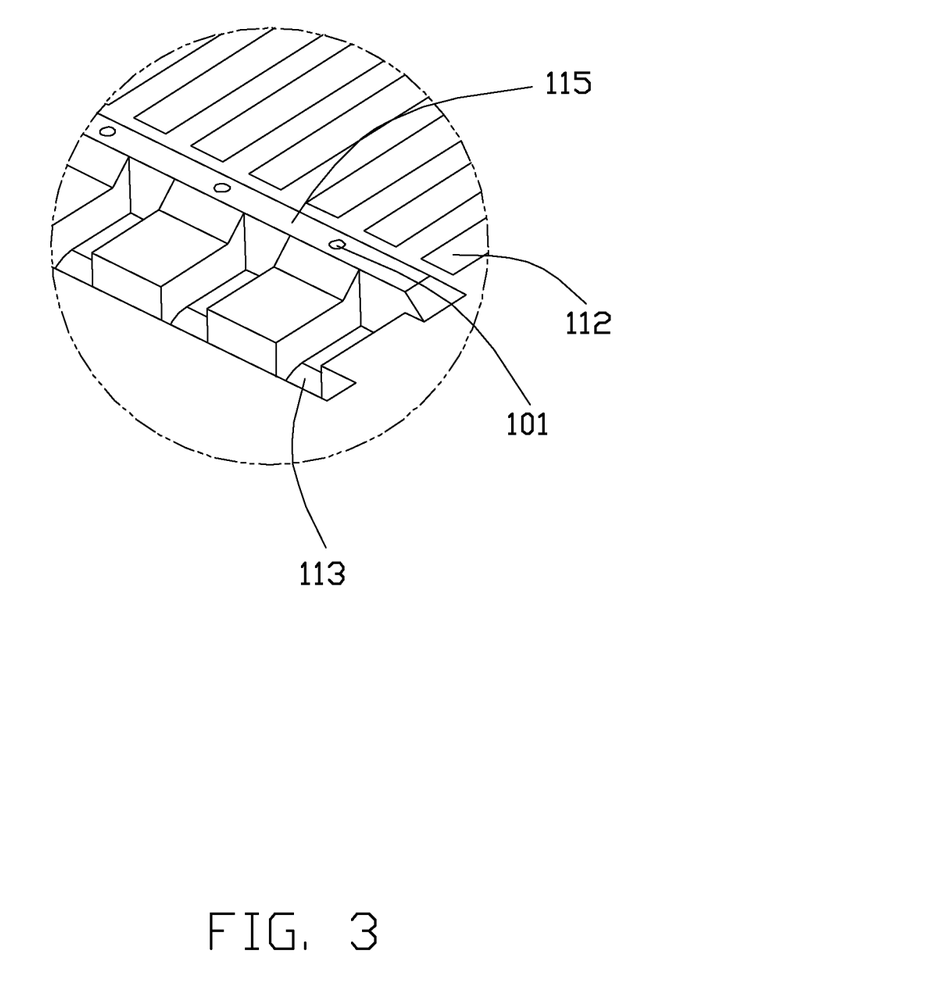
FIG. 3 is an enlarge view of the circular portion of the light signal gathering device as shown in FIG. 2.

Referring to FIG. 1 to FIG. 3, the light signal gathering device 8 includes a resin body 1 and a plurality of passageways 101 set on the resin body 1. The resin body 1 includes a bottom surface 11 assembled to the substrate 6 and a top surface 10 opposite to the bottom surface 11. The resin body 1 includes a plurality of slots 112 and a recess 113 recessed from the bottom surface 11 to the inner of the resin body 1. The slots 112 extend in a direction perpendicular to that of the recess 113. The resin body 1 further includes a plurality of supporting portions 110 extending from the bottom surface 11 and a pair of through holes 102 penetrating the top surface 10 and the bottom surface 11. The passageways 101 further penetrate the top surface 10 and the bottom surface 11.

Figure 7:
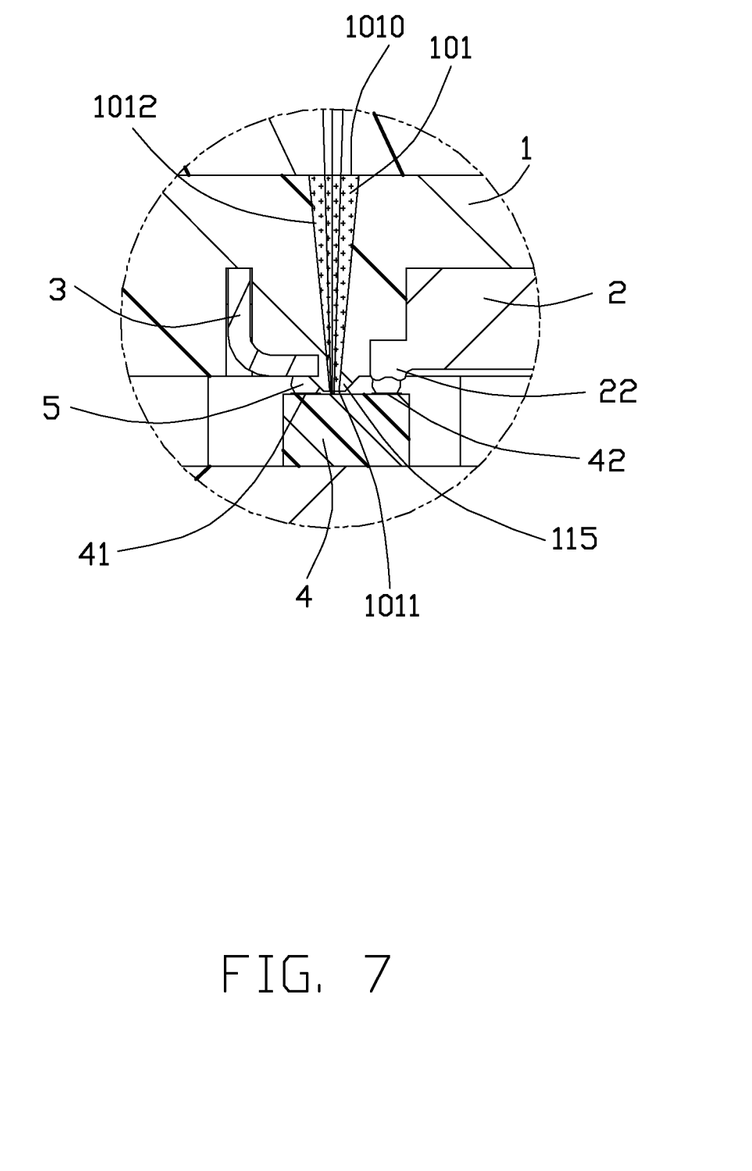
FIG. 7 is an enlarge view of the circular portion as shown in FIG. 6.

Referring to FIG. 7, the passageways 101 are configured to funnel shape and each includes a top end 1010 for the light signals entering and a bottom end 1011 opposite to the top end 1010 for the light signals coming out. The area of the top end 1010 is larger than that of the bottom end 1011, thus the light signals enter from the top end 1010 be gathered and come out from the bottom end 1011. The passageways 101 are filled with optical cement 1012 of the inner surface of the passageways 101 are plated with metal layer. The refractive index of the optical cement 1012 is larger than that of the resin body 1. The best situation is the refractive index of the optical cement 1012 larger than 1.6 and the refractive index of the resin body 1 smaller than 1.5 to achieve less loss of the light signals. Referring to FIGS. 3 and 7, the resin body 1 forms a downwardly protruding structure 115 within the recess 13 around the bottom ends 1011 to have the bottom ends 1011 closely confronting the optoelectronic device 4.

The electrical contact 2 includes a base portion 21, a first tail portion 22 and a second tail portion 23 extending from two opposite ends of the base portion 21. The retention contact 3 includes a position portion 31 and a plurality of position ends 32 extending from the position portion 31. The optoelectronic device 4 includes a plurality of first pads 41 locating in a first row and a plurality of second pads 42 locating in a second row.

Figure 4:
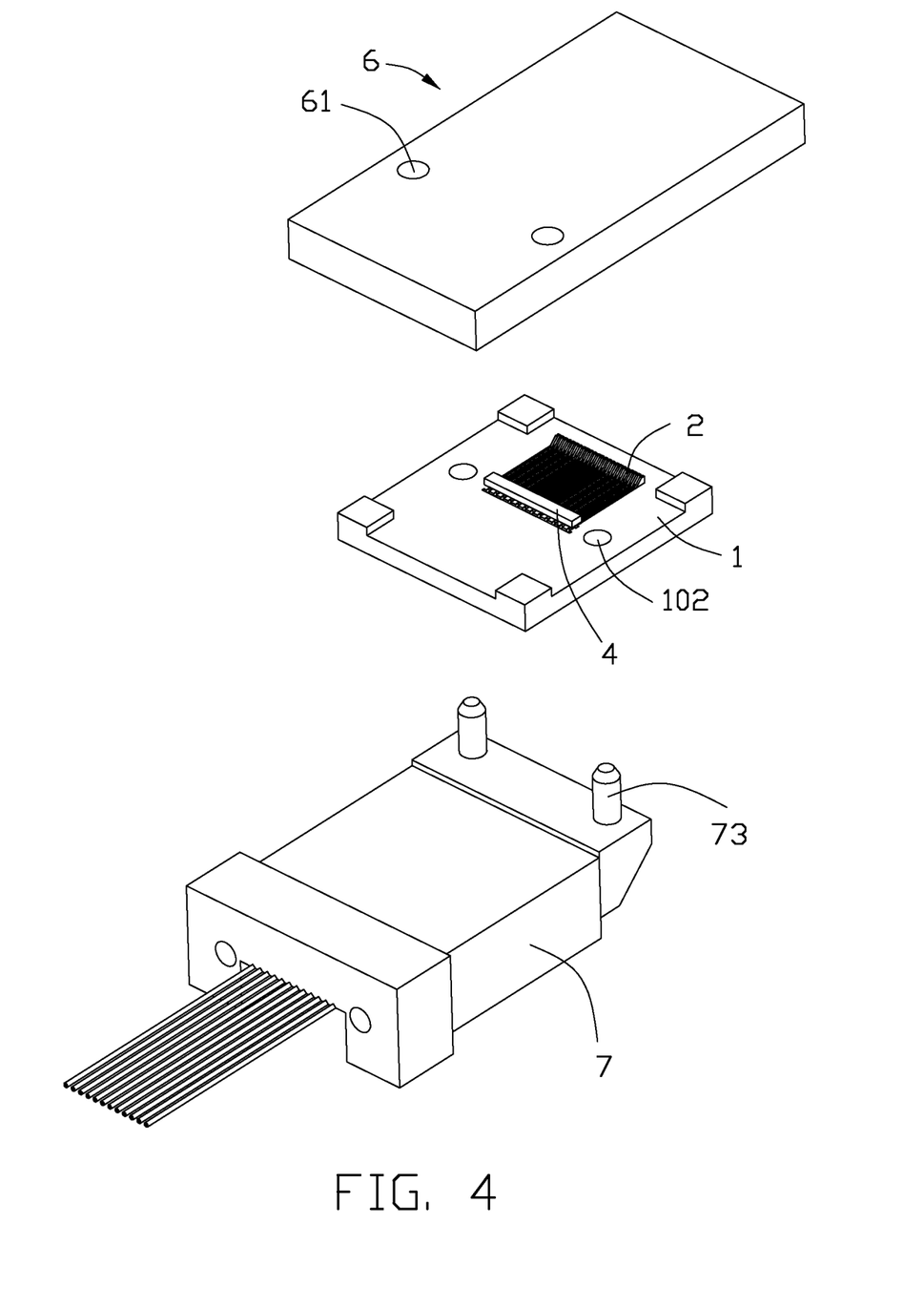
FIG. 4 is an exploded view of the optical module, the substrate and the fiber assembly.
Figure 5:
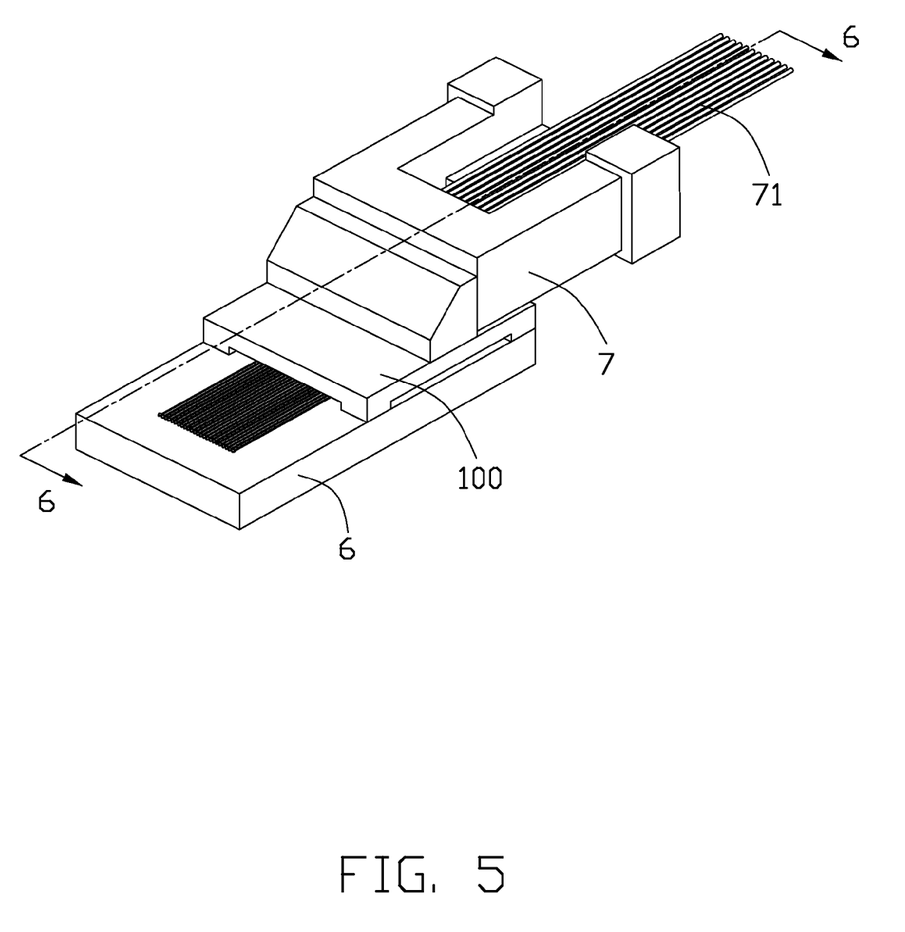
FIG. 5 is an assembled view of the optical module, the substrate and the fiber assembly.

Referring to FIG. 4 and FIG. 7, when assemble the optical module 100, the electrical contacts 2 are assembled to the slots 112 and the retention contacts 3 are assembled to the recesses 113 of the resin body 1, respectively; the first pads 41 of the optoelectronic device 4 are soldered to the position ends 32 of the retention contact 3 through soldering materials 5, and the second pads 42 of the optoelectronic device 4 are soldered to the first tail portions 22 of the electrical contacts 3 through soldering materials 5, thus the optoelectronic device 4 is in align with the passageways 101 to receive the light signals. The retention contacts 3 are used to position the optoelectronic device 4.

When the optical module 100 is used, the second tail portions 23 of the electrical contacts 2 are soldered to the substrate 6 through soldering materials 5, the second tail portions 23 extending beyond the bottom surface 11, the optoelectronic device 4 and the supporting portions 110 supports on the substrate 6 and the position holes 61 of the substrate 6 are in align with the through holes 102 of the optical module 100. The fiber assembly 7 includes a pair of posts 73. The pair of posts 73 is assembled to the through holes 102 of the optical module 100 and the position holes 61 of the substrate 6 to position the fiber assembly 7, the optical module 100 and the substrate 6.

Figure 6:
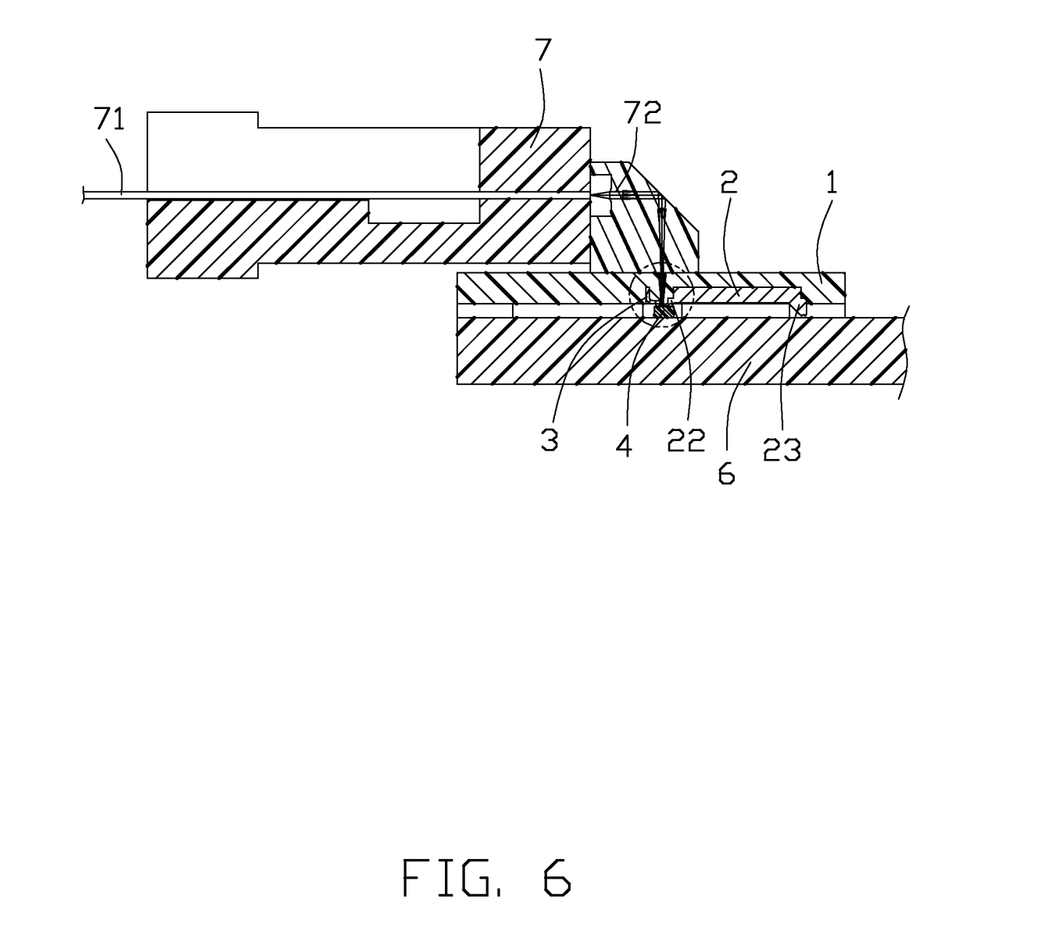
FIG. 6 is a cross-sectional view of the optical module, the substrate and the fiber assembly as shown in FIG. 5 along line 6-6.

Referring to FIG. 6, the lens 72 of the fiber assembly 7 changes the diverging light signals sent by the fibers 71 to paralleled light signals and then be refocused by the light signal gathering device 8, due to the optoelectronic device 4 being in align with the light signal gathering device 8 accurately, the light signals can be received by the optoelectronic device 4 accurately.

Figure 8:
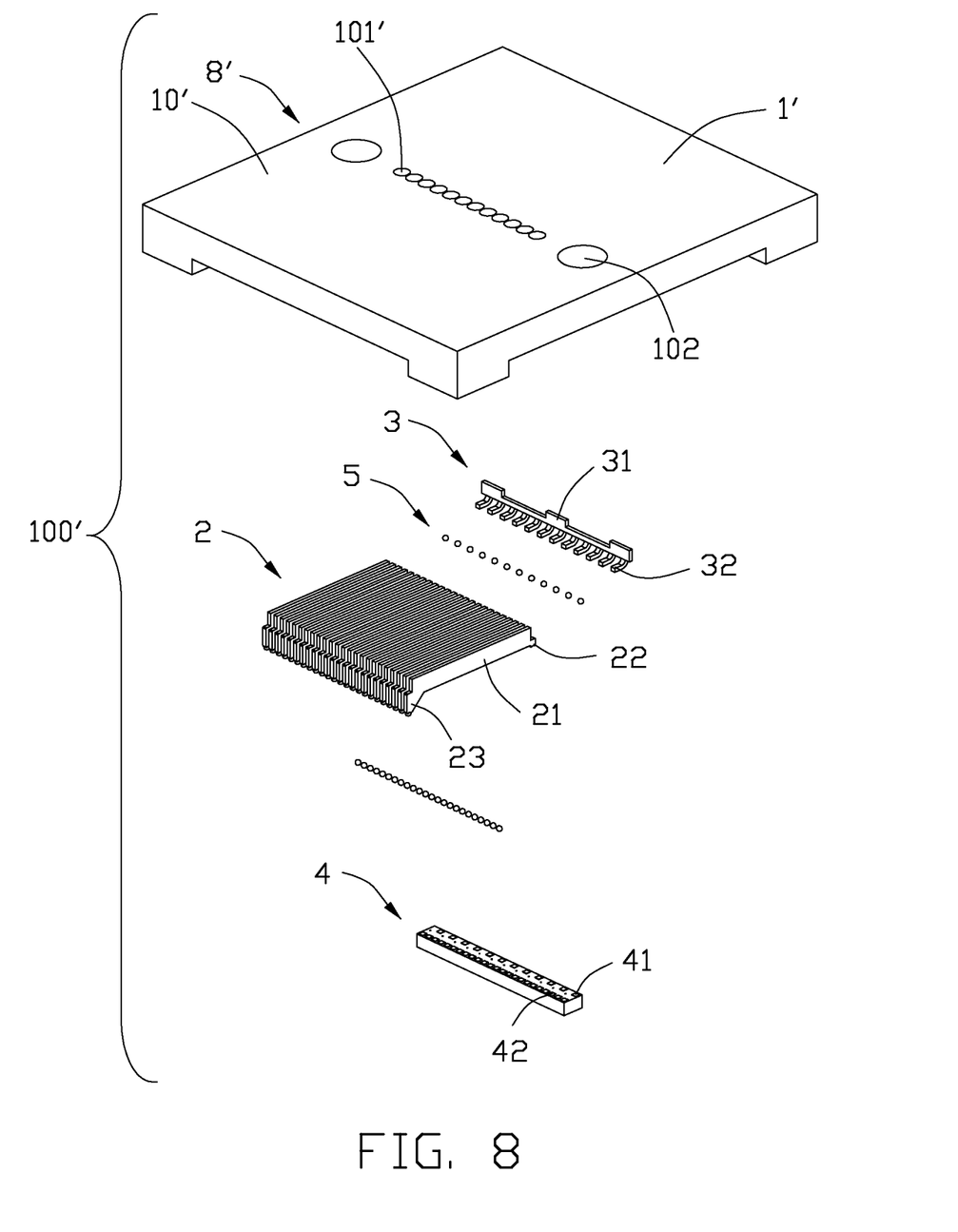
FIG. 8 is exploded view of a second embodiment of the optical module according to the present invention.
Figure 9:
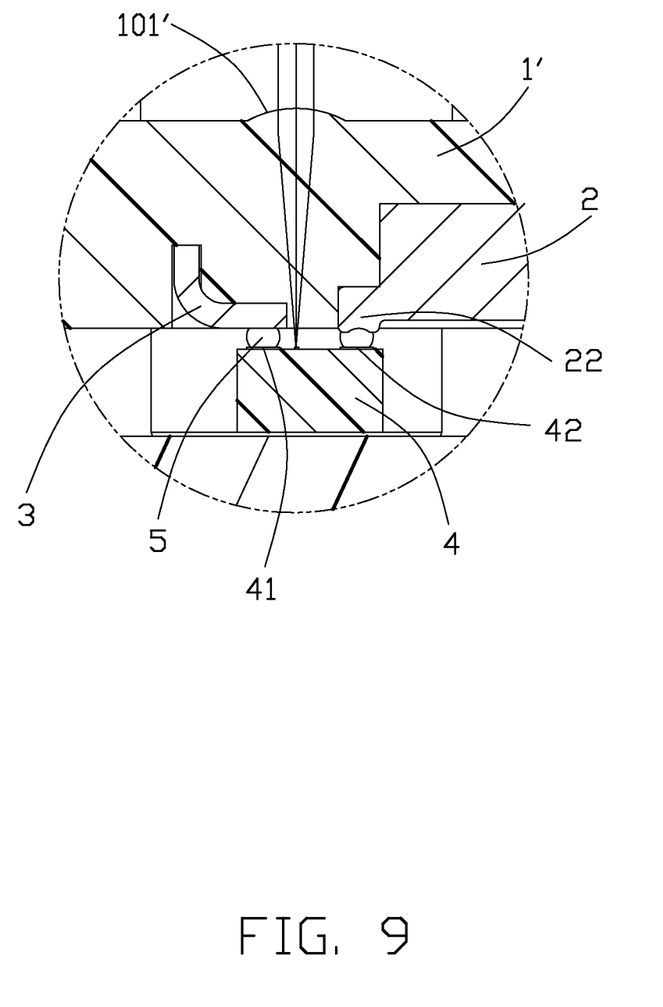
FIG. 9 is a cross-sectional view of one portion of the optical module as showing in FIG. 8.

FIGS. 8-9 shows a second embodiment of the optical module 100'. The difference between the two embodiments is the light signal gathering device 8' in the second embodiment includes a plurality of lenses 101' set on the top surface 10' of the resin body 1' and in align with the optoelectronic device 4. The lenses 101' are used to gather light signals and then the light signals can be received by the optoelectronic device 4 accurately.

The light signal gathering device 8, 8' in this invention includes a resin body 1, 1' and a light signal gathering portion set on the resin body 1, 1'. The light signal gathering portion is a passageway 101 with funnel shape and penetrates the resin body 1 or a lens 101' set on the top surface 10' of the resin body 1'.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. An optical module set on a substrate for assembling with a fiber, comprising:
    a light signal gathering device including a resin body and a light signal gathering portion set on the resin body for refocusing light signals;
    a plurality of electrical contacts set on the light signal gathering device; and
    an optoelectronic device soldered to the electrical contacts for receiving the light signals refocused by the light signal gathering portion and transferring the light signals to electrical signals; wherein
    the light signal gathering portion is a passageway penetrating the resin body, the passageway is configured with a funnel shape and includes a top end for the light signals entering and a bottom end opposite to the top end and smaller than the top end for the light signals coming out; wherein the electrical contact includes a base portion positioned in the resin body, a first tail portion and a second tail portion extending from two opposite ends of the base portion, the first tail portion is soldered to the optoelectronic device and the second tail is soldered to the substrate.

2. The optical module as claimed in claim 1, wherein the optical module further includes a retention contact assembled to the resin body and soldered to the optoelectronic device.

3. The optical module as claimed in claim 2, wherein the retention contact includes a position portion positioned in the resin body and a plurality of position ends extending from the position portion for being soldered to the optoelectronic device.

4. The optical module as claimed in claim 3, wherein the resin body includes a bottom surface assembled to the substrate, a plurality of slots and a recess recessed from the bottom surface to the inner of the resin body, the slots extend in a direction perpendicular to that of the recess, the electrical contacts are received in the slots and the retention contact is received in the recess.

5. The optical module as claimed in claim 4, wherein the second tail portion extends beyond the resin body.

\* \* \* \* \*